(12) United States Patent
Ishii et al.

(10) Patent No.: US 10,887,644 B2
(45) Date of Patent: Jan. 5, 2021

(54) RECEPTION DEVICE, DATA PROCESSING METHOD, AND PROGRAM

(71) Applicant: Sony Corporation, Tokyo (JP)

(72) Inventors: Michito Ishii, Kanagawa (JP); Shinji Negishi, Kanagawa (JP); Kazuhiro Ishigaya, Kanagawa (JP); Takehito Watanabe, Tokyo (JP); Yasuyuki Chaki, Kanagawa (JP); Noriaki Ooishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 75 days.

(21) Appl. No.: 15/747,891

(22) PCT Filed: Aug. 18, 2016

(86) PCT No.: PCT/JP2016/074105
§ 371 (c)(1),
(2) Date: Jan. 26, 2018

(87) PCT Pub. No.: WO2017/038481
PCT Pub. Date: Mar. 9, 2017

(65) Prior Publication Data
US 2018/0242035 A1 Aug. 23, 2018

(30) Foreign Application Priority Data

Sep. 1, 2015 (JP) ................................ 2015-171993

(51) Int. Cl.
*H04N 21/43* (2011.01)
*H04N 21/462* (2011.01)
(Continued)

(52) U.S. Cl.
CPC ........ *H04N 21/4302* (2013.01); *H04H 20/18* (2013.01); *H04H 60/40* (2013.01);
(Continued)

(58) Field of Classification Search
CPC ......... H04N 21/4302; H04N 21/44004; H04N 21/4622; H04H 20/18; H04H 60/40; H04H 60/91; H04L 7/00
See application file for complete search history.

(56) References Cited

U.S. PATENT DOCUMENTS 7,418,012 B2 * 8/2008 Busch .............. H04N 21/23608
370/508
2002/0059641 A1 * 5/2002 Tsujimura ............ H04N 5/4401
725/135
(Continued)

FOREIGN PATENT DOCUMENTS

JP 2012-205075 A 10/2012
JP 2013-009332 A 1/2013
(Continued)

OTHER PUBLICATIONS

K. Matsumura, "The Development of Hybridcast," Hybridcastの開発 NHK 技研 R & D, 2011.

*Primary Examiner* — Rong Le
(74) *Attorney, Agent, or Firm* — Michael Best & Friedrich LLP

(57) ABSTRACT

The present technology relates to a reception device, data processing method, and a program which make it possible to smoothly switch the output of data in a case where data transmitted via different transmission paths is received to be output.

A reception device includes: a reception unit that receives a plurality of pieces of data separately transmitted via different transmission paths and given time stamps corresponding to each other; an output control unit that selects data to be output from among the plurality of pieces of data and controls a timing of outputting the selected data on the basis of the time stamp of a piece of data having a latest time stamp among the plurality of pieces of data; and an accu- (Continued)

mulation unit that accumulates at least the plurality of pieces of data given the time stamps later than the time stamp of the data that has been output from among the received plurality of pieces of data. The present technology can be applied to, for example, a reception device of a broadcasting system using MMT.

13 Claims, 4 Drawing Sheets

(51) Int. Cl.
- *H04N 21/44* (2011.01)
- *H04H 20/18* (2008.01)
- *H04L 7/00* (2006.01)
- *H04H 60/40* (2008.01)
- *H04H 60/91* (2008.01)

(52) U.S. Cl.
CPC ......... *H04L 7/00* (2013.01); *H04N 21/44004* (2013.01); *H04N 21/4622* (2013.01); *H04H 60/91* (2013.01)

(56) References Cited

U.S. PATENT DOCUMENTS

| | | | | |
|---|---|---|---|---|
| 2002/0103919 A1* | 8/2002 | Hannaway | ....... | H04N 21/23406 709/231 |
| 2006/0083315 A1* | 4/2006 | Sato | ....... | H04H 60/12 375/240.25 |
| 2007/0220561 A1* | 9/2007 | Girardeau, Jr. | .... | H04N 21/2368 725/80 |
| 2008/0060045 A1* | 3/2008 | Jordan | ....... | H04J 3/0632 725/134 |
| 2008/0209482 A1* | 8/2008 | Meek | ....... | H04N 5/607 725/105 |
| 2010/0124196 A1* | 5/2010 | Bonar | ....... | H04B 7/0689 370/329 |
| 2010/0278179 A1* | 11/2010 | Zhao | ....... | H04L 1/188 370/390 |
| 2010/0329141 A1* | 12/2010 | Apostol | ....... | H04L 47/22 370/252 |
| 2011/0043614 A1* | 2/2011 | Kitazato | ....... | H04N 21/235 348/51 |
| 2011/0169966 A1* | 7/2011 | Norman | ....... | H04N 17/004 348/194 |
| 2012/0099656 A1* | 4/2012 | Ohya | ....... | H04N 21/234327 375/240.23 |
| 2012/0230389 A1* | 9/2012 | Laurent | ....... | H04N 21/235 375/240.01 |
| 2013/0077501 A1* | 3/2013 | Krishnaswamy | ..... | H04L 47/193 370/252 |
| 2013/0293677 A1* | 11/2013 | Lee | ....... | H04N 21/4307 348/43 |
| 2014/0176795 A1* | 6/2014 | Joo | ....... | H04H 20/18 348/513 |
| 2014/0241479 A1* | 8/2014 | Someya | ....... | H04L 7/00 375/362 |
| 2014/0347981 A1* | 11/2014 | Rangne | ....... | H04L 1/22 370/228 |
| 2014/0375894 A1* | 12/2014 | Kellerman | ....... | H04N 21/4347 348/731 |
| 2015/0135247 A1* | 5/2015 | Kitazato | ....... | H04H 20/18 725/110 |
| 2015/0373380 A1* | 12/2015 | Tsukagoshi | ....... | H04L 5/0044 725/109 |
| 2016/0337672 A1* | 11/2016 | Lee | ....... | H04N 21/236 |

FOREIGN PATENT DOCUMENTS

| | | |
|---|---|---|
| JP | 2013-009343 A | 1/2013 |
| JP | 2014-509111 A | 4/2014 |
| JP | 2014-200054 A | 10/2014 |
| WO | 2013/190789 A1 | 12/2013 |

\* cited by examiner

RECEPTION DEVICE, DATA PROCESSING METHOD, AND PROGRAM

TECHNICAL FIELD

The present technology relates to a reception device, a data processing method, and a program and, more particularly, to a reception device, a data processing method, and a program suitably used in the case of receiving data transmitted via different transmission paths and switching the received data to output.

BACKGROUND ART

In a next generation broadcasting system using MPEG media transport (MMT), data can be transmitted using both of a broadcast transmission path and a communication transmission path. For example, it is possible to transmit data relating to a main video via the broadcast transmission path and transmit data relating to a sub video (for example, a video at another angle) corresponding to the main video, subtitle data, audio data in a language different from that of the main video, and the like via the communication transmission path (for example, refer to Patent Document 1).

CITATION LIST

Patent Document

Patent Document 1: Japanese Patent Application Laid-Open No. 2013-9343

SUMMARY OF THE INVENTION

Problems to be Solved by the Invention

However, it is expected that data transmission in the communication transmission path will be delayed than the case of the broadcast transmission path due to an increase in traffic, failure, or the like. Therefore, for example, in a case where the main video transmitted via the broadcast transmission path and the sub video transmitted via the communication transmission path are switched in a receiving side device, there is a risk of occurrence of disturbance of video, audio, and the like. For example, at the time of switching from the main video to the sub video, there is a risk of occurrence of repeating in which the time of the output sub video is traced back from the time of the main video. In addition, for example, at the time of switching from the sub video to the main video, there is a risk of occurrence of skipping in which the time of the output main video is advanced from the time of the sub video.

The present technology has been made in view of such a situation and is intended to make it possible to smoothly switch the output of data in a case where data transmitted via different transmission paths is received to be output.

Solutions to Problems

A reception device according to an aspect of the present technology includes: a reception unit that receives a plurality of pieces of data separately transmitted via different transmission paths and given time stamps corresponding to each other; an output control unit that selects data to be output from among the plurality of pieces of data and controls a timing of outputting the selected data on the basis of the time stamp of a piece of data having a latest time stamp among the plurality of pieces of data; and an accumulation unit that accumulates at least the plurality of pieces of data given the time stamps later than the time stamp of the data that has been output from among the received plurality of pieces of data.

The reception unit can include a first reception unit that receives first data given a first time stamp and transmitted via a first transmission path and a second reception unit that receives second data given a second time stamp corresponding to the first time stamp and transmitted via a second transmission path, and further provided are a first clock signal generation unit that generates a first clock signal on the basis of the first time stamp; a second clock signal generation unit that generates a second clock signal on the basis of the second time stamp; a first clock signal correction unit that corrects the first clock signal; and a second clock signal correction unit that corrects the second clock signal, in which the first clock signal correction unit can be configured to synchronize time of the first clock signal to time of the corrected second clock signal when output is switched from the second data to the first data, the second clock signal correction unit can be configured to synchronize time of the second clock signal to time of the corrected first clock signal when output is switched from the first data to the second data, the output control unit can be configured to control output of the first data on the basis of the corrected first clock signal and control output of the second data on the basis of the corrected second clock signal, and the accumulation unit can be configured to, in a case where the first data is being output, accumulate at least the first data given the first time stamp later than time of the corrected first clock signal and the second data given the second time stamp later than time of the corrected first clock signal and, in a case where the second data is being output, accumulate at least the first data given the first time stamp later than time of the corrected second clock signal and the second data given the second time stamp later than time of the corrected second clock signal.

The first transmission path can be assigned as a broadcast transmission path, the second transmission path can be assigned as a communication transmission path, and the second clock signal correction unit can be configured to, in a case where the most recent second time stamp of the second data accumulated in the accumulation unit is earlier than time of the corrected first clock signal, set time of the second clock signal on the basis of time of the most recent second time stamp when output is switched from the first data to the second data.

The accumulation unit can be configured to restrict an accumulation amount of the first data in a case where a delay amount of the communication transmission path exceeds a first threshold value.

The first clock signal correction unit can be configured to, in a case where the oldest first time stamp of the first data accumulated in the accumulation unit is later than time of the corrected second clock signal, set time of the first clock signal on the basis of time of the oldest first time stamp when output is switched from the second data to the first data.

The output control unit can be configured not to switch output from the first data to the second data in a case where a delay amount of the communication transmission path exceeds a second threshold value.

The first clock signal correction unit can be configured to, in a case where the most recent first time stamp of the first data accumulated in the accumulation unit is earlier than time of the corrected second clock signal, set time of the first clock signal on the basis of time of the most recent first time stamp when output is switched from the second data to the first data, and the second clock signal correction unit can be configured to, in a case where the most recent second time stamp of the second data accumulated in the accumulation unit is earlier than time of the corrected first clock signal, set time of the second clock signal on the basis of time of the most recent second time stamp when output is switched from the first data to the second data.

The accumulation unit can be configured to restrict an accumulation amount of the first data in a case where a delay amount of the second transmission path relative to the first transmission path exceeds a first threshold value and restrict an accumulation amount of the second data in a case where a delay amount of the first transmission path relative to the second transmission path exceeds a second threshold value.

The first clock signal correction unit can be configured to, in a case where the oldest first time stamp of the first data accumulated in the accumulation unit is later than time of the corrected second clock signal, set time of the first clock signal on the basis of time of the oldest first time stamp when output is switched from the second data to the first data, and the second clock signal correction unit can be configured to, in a case where the oldest second time stamp of the second data accumulated in the accumulation unit is later than time of the corrected first clock signal, set time of the second clock signal on the basis of time of the oldest second time stamp when output is switched from the first data to the second data.

The output control unit can be configured not to switch output from the first data to the second data in a case where a delay amount of the second transmission path relative to the first transmission path exceeds a third threshold value and not to switch output from the second data to the first data in a case where a delay amount of the first transmission path relative to the second transmission path exceeds a fourth threshold value.

Further provided are a clock signal generation unit that generates a plurality of clock signals on the basis of the time stamp of each piece of data; and a clock signal correction unit that corrects the plurality of clock signals, in which the clock signal correction unit can be configured to synchronize time of one of the clock signals corresponding to switching destination data to time of corrected one of the clock signals corresponding to switching source data when data to be output is switched, the output control unit can be configured to control the output of each piece of data on the basis of each corresponding one of the clock signals, and the accumulation unit can be configured to accumulate at least the plurality of pieces of data given the time stamps later than time of corrected one of the clock signals corresponding to data being output.

The clock signal correction unit can be configured to, in a case where the most recent time stamp of the switching destination data accumulated in the accumulation unit is earlier than time of corrected one of the clock signals corresponding to the switching source data, set time of one of the clock signals corresponding to the switching destination data on the basis of time of the most recent time stamp of the switching destination data when data to be output is switched.

The accumulation unit can be configured to restrict an accumulation amount of second data in a case where first data among the plurality of pieces of data is being output, in a case where a delay amount of a first transmission path used for transmission of the first data relative to a second transmission path used for transmission of the second data among the plurality of pieces of data exceeds a first threshold value.

The clock signal correction unit can be configured to, in a case where the oldest time stamp of the second data accumulated in the accumulation unit is later than time of a first clock signal corresponding to the first data, which has been corrected, set time of a second clock signal corresponding to the second data on the basis of time of the oldest time stamp when output is switched from the first data to the second data.

The output control unit can be configured not to switch output from the second data to the first data in a case where a delay amount of the first transmission path relative to the second transmission path exceeds a second threshold value.

The plurality of pieces of data can be transmitted using MPEG media transport (MMT), and the time stamp can be assigned as a presentation time stamp (PTS).

A data processing method according to an aspect of the present technology includes: a reception control step of controlling reception of a plurality of pieces of data separately transmitted via different transmission paths and given time stamps corresponding to each other; an output control step of selecting data to be output from among the plurality of pieces of data and controlling a timing of outputting the selected data on the basis of the time stamp of a piece of data having a latest time stamp among the plurality of pieces of data; and an accumulation control step of controlling such that at least the plurality of pieces of data given the time stamps later than the time stamp of the data that has been output is accumulated from among the received plurality of pieces of data.

A program according to an aspect of the present technology causes a computer to execute processes including: a reception control step of controlling reception of a plurality of pieces of data separately transmitted via different transmission paths and given time stamps corresponding to each other; an output control step of selecting data to be output from among the plurality of pieces of data and controlling a timing of outputting the selected data on the basis of the time stamp of a piece of data having a latest time stamp among the plurality of pieces of data; and an accumulation control step of controlling such that at least the plurality of pieces of data given the time stamps later than the time stamp of the data that has been output is accumulated from among the received plurality of pieces of data.

According to an aspect of the present technology, a plurality of pieces of data separately transmitted via different transmission paths and given time stamps corresponding to each other is received, data to be output is selected from among the plurality of pieces of data, a timing of outputting the selected data is controlled on the basis of the time stamp of a piece of data having a latest time stamp among the plurality of pieces of data, and at least the plurality of pieces of data given the time stamps later than the time stamp of the data that has been output is accumulated from among the received plurality of pieces of data.

Effects of the Invention

According to an aspect of the present technology, it is possible to smoothly switch the output of data in a case where data transmitted via different transmission paths is received to be output.

Note that the effects described in the present description merely serve as examples and the effects of the present technology are not limited to the effects described in the present description. There may be an additional effect as well.

MODE FOR CARRYING OUT THE INVENTION

Modes for carrying out the present technology (hereinafter, referred to as embodiments) will be described below. Note that the description will be given in the following order.
1. Embodiments
2. Variations

1. Embodiments

{Configuration Example of Reception Device}

Figure 1:
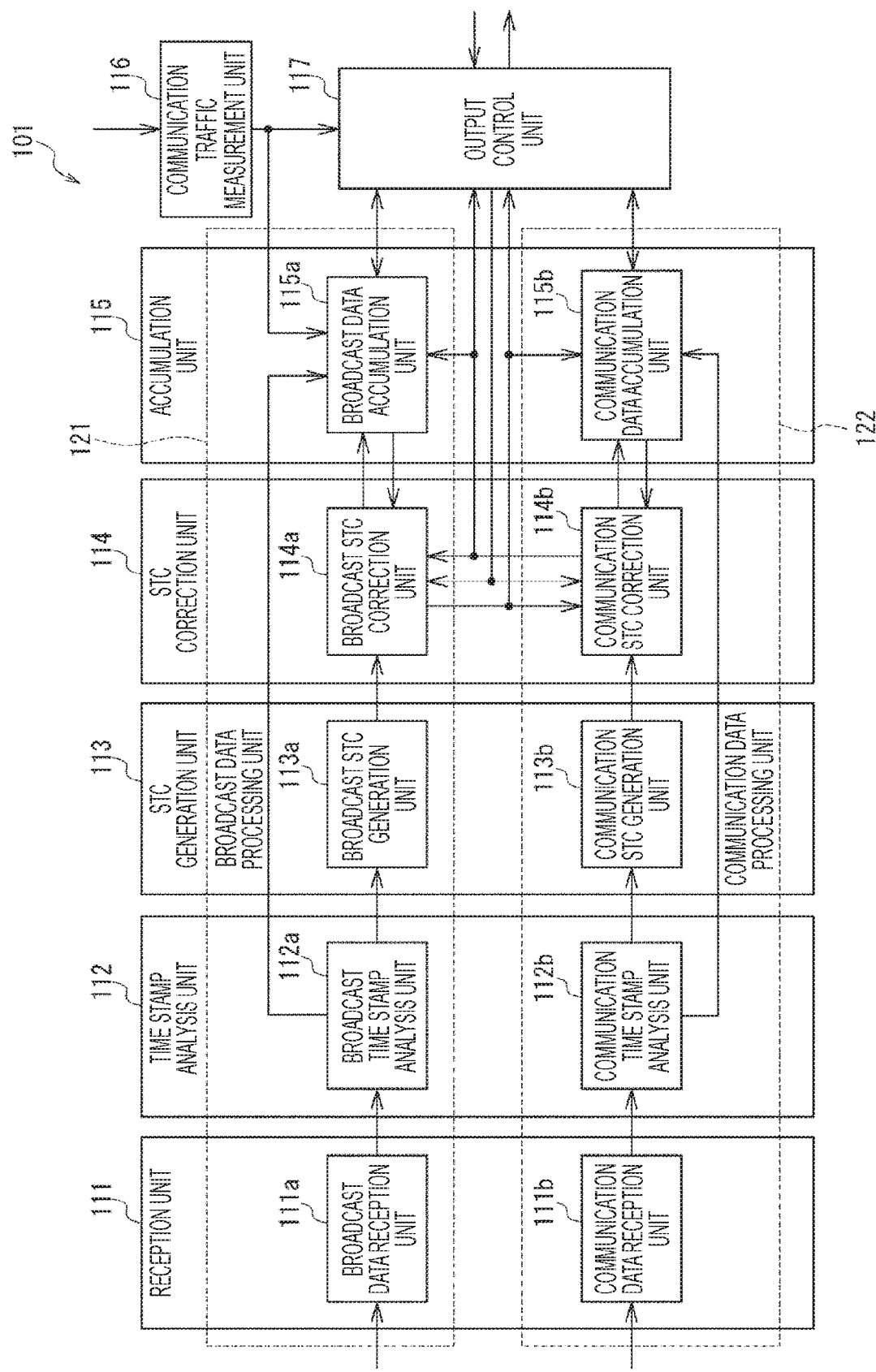
FIG. 1 is a block diagram illustrating an embodiment of a reception device to which the present technology is applied.

FIG. 1 is a block diagram illustrating an embodiment of a reception device 101 to which the present technology is applied.

The reception device 101 is a device that receives data transmitted from a broadcast station or the like using MMT and controls the output of the data that has been received. A data transmission scheme conforms to, for example, the ARIB-STD-B60 standard.

The reception device 101 includes a reception unit 111, a time stamp analysis unit 112, a system time clock (STC) generation unit 113, an STC correction unit 114, an accumulation unit 115, a communication traffic measurement unit 116, and an output control unit 117. The reception unit 111 includes a broadcast data reception unit 111a and a communication data reception unit 111b. The time stamp analysis unit 112 includes a broadcast time stamp analysis unit 112a and a communication time stamp analysis unit 112b. The STC generation unit 113 includes a broadcast STC generation unit 113a and a communication STC generation unit 113b. The STC correction unit 114 includes a broadcast STC correction unit 114a and a communication STC correction unit 114b. The accumulation unit 115 includes a broadcast data accumulation unit 115a and a communication data accumulation unit 115b.

In addition, the broadcast data reception unit 111a, the broadcast time stamp analysis unit 112a, the broadcast STC generation unit 113a, the broadcast STC correction unit 114a, and the broadcast data accumulation unit 115a constitute a broadcast data processing unit 121. The communication data reception unit 111b, the communication time stamp analysis unit 112b, the communication STC generation unit 113b, the communication STC correction unit 114b, and the communication data accumulation unit 115b constitute a communication data processing unit 122.

The broadcast data reception unit 111a receives data transmitted from a broadcast station or the like via a broadcast transmission path (hereinafter referred to as broadcast data). The broadcast data reception unit 11a supplies the received broadcast data to the broadcast time stamp analysis unit 112a.

The communication data reception unit 111b receives data transmitted from a broadcast station or the like via a communication transmission path (hereinafter referred to as communication data). The communication data reception unit 111b supplies the received communication data to the communication time stamp analysis unit 112b.

Here, delay or non-delivery of the broadcast data hardly occurs in the broadcast transmission path. On the other hand, the communication transmission path is constituted by, for example, a network such as the Internet and there are cases where delay or non-delivery of the communication data occurs due to an increase in traffic, failure, or the like.

In addition, the broadcast data and the communication data include data relating to contents such as video, audio, and subtitles (hereinafter referred to as content data) and data used for controlling, for example, the output of contents (hereinafter referred to as control data). Furthermore, the broadcast data and the communication data are each divided into packets and transmitted in packet units. Note that, hereinafter, a packet of the content data is referred to as a content packet and a packet of the control data is referred to as a control packet.

Additionally, a time stamp is given to each content packet of the broadcast data and the communication data. The time stamp given to the broadcast data and the time stamp given to the communication data correspond to each other. That is, the time stamp given to each data is a time stamp of the same system, indicating time along a common time axis and having the same specifications. For example, a decode time stamp (DTS) indicating the decoding time of the content data, a presentation time stamp (PTS) indicating the presentation time of the content data, and the like are used as this time stamp. Note that a case where the PTS is used as the time stamp will be mainly described below as an example. Therefore, hereinafter, unless otherwise specified, the term of the time stamp means the PTS.

Incidentally, the time stamps may be given to all content packets or the time stamps may be given to some content packets. In addition, for example, the time stamp given to each content packet may be included in each content packet to be transmitted or may be included in the control packet and transmitted apart from the content packet. Furthermore, for example, the value of the time stamp may be included in the content packet or the control packet as it is, or data used for calculating the time stamp may be included in the content packet or the control packet such that the value of the time stamp is calculated on a receiving side.

Meanwhile, the control packet includes time data based on a network time protocol (NTP), for example.

The broadcast time stamp analysis unit 112a analyzes the time stamp of the broadcast data (hereinafter referred to as broadcast time stamp). For example, the broadcast time stamp analysis unit 112a extracts the broadcast time stamp from the broadcast data and calculates the broadcast time stamp. Then, the broadcast time stamp analysis unit 112a supplies the broadcast time stamp to the broadcast STC generation unit 113a. After analyzing the broadcast time stamp, the broadcast time stamp analysis unit 112a also supplies the broadcast data to the broadcast data accumulation unit 115a to accumulate.

The communication time stamp analysis unit 112b analyzes the time stamp of the communication data (hereinafter referred to as communication time stamp). For example, the communication time stamp analysis unit 112b extracts the communication time stamp from the communication data and calculates the communication time stamp. Then, the communication time stamp analysis unit 112b supplies the communication time stamp to the communication STC generation unit 113b. After analyzing the communication time stamp, the communication time stamp analysis unit 112b also supplies the communication data to the communication data accumulation unit 115b to accumulate.

The broadcast STC generation unit 113a generates an STC on the basis of the broadcast time stamp (hereinafter referred to as broadcast STC). The broadcast STC is a clock signal used, for example, for controlling the output of the content data included in the broadcast data. The broadcast STC generation unit 113a supplies the broadcast STC to the broadcast STC correction unit 114a.

The communication STC generation unit 113b generates an STC on the basis of the communication time stamp (hereinafter referred to as communication STC). The communication STC is a clock signal used, for example, for controlling the output of the content data included in the communication data. The communication STC generation unit 113b supplies the communication STC to the communication STC correction unit 114b.

Note that an arbitrary method can be adopted as a generation method for each STC. For example, when a general clock recovery method is used, an STC is generated by calculating a linear value using the arrival time of the packet including the time stamp and the value of the time stamp. In this case, for example, a time stamp included in a packet whose arrival time is far from the arrival time of other packets may not be adopted.

At the timing of switching the output data notified from the output control unit 117, the broadcast STC correction unit 114a corrects the broadcast STC on the basis of the corrected communication STC (hereinafter referred to as correction communication STC) supplied from the communication STC correction unit 114b and the time stamp of the broadcast data accumulated in the broadcast data accumulation unit 115a. The broadcast STC correction unit 114a supplies the corrected broadcast STC (hereinafter referred to as correction broadcast STC) to the communication STC correction unit 114b, the broadcast data accumulation unit 115a, the communication data accumulation unit 115b, and the output control unit 117.

At the timing of switching the output data notified from the output control unit 117, the communication STC correction unit 114b corrects the communication STC on the basis of the correction broadcast STC supplied from the broadcast STC correction unit 114a and the time stamp of the communication data accumulated in the communication data accumulation unit 115b. The communication STC correction unit 114b supplies the correction communication STC that has been corrected to the broadcast STC correction unit 114a, the broadcast data accumulation unit 115a, the communication data accumulation unit 115b, and the output control unit 117.

The broadcast data accumulation unit 115a temporarily accumulates the broadcast data and supplies the accumulated broadcast data to the output control unit 117. In addition, as will be described later, the broadcast data accumulation unit 115a adjusts an accumulation amount (buffer amount) of the broadcast data on the basis of the correction broadcast STC, the correction communication STC, and a measurement result for the traffic of the communication transmission path supplied from the communication traffic measurement unit 116.

The communication data accumulation unit 115b temporarily accumulates the communication data and supplies the accumulated communication data to the output control unit 117. In addition, as will be described later, the communication data accumulation unit 115b adjusts an accumulation amount (buffer amount) of the communication data on the basis of the correction broadcast STC and the correction communication STC.

The communication traffic measurement unit 116 measures the traffic of the communication transmission path through which the communication data is transmitted. The communication traffic measurement unit 116 supplies the measurement result for the traffic of the communication transmission path to the broadcast data accumulation unit 115a and the output control unit 117.

Note that an arbitrary method can be adopted as a measurement method for the traffic of the communication transmission path. For example, the communication traffic measurement unit 116 measures the traffic of the communication transmission path using a ping command of an IP network, a loopback command of another communication network, or the like. In addition, for example, the communication traffic measurement unit 116 may perform a smoothing process such as removing an abnormal value.

As will be described later, the output control unit 117 controls the output of the content data included in the broadcast data and the content data included in the communication data on the basis of an instruction coming from the outside, the correction broadcast STC, the correction communication STC, and the measurement result for the traffic of the communication transmission path. For example, the output control unit 117 selects and outputs one of the content data of the broadcast data and the content data of the communication data. Then, in a latter stage of the output control unit 117, a process of presenting the content data (for example, display of video/image and output of audio) is performed.

Next, an output control process executed by the reception device 101 will be described with reference to a flowchart in FIG. 2.

In step S1, the output control unit 117 determines whether the broadcast data is being output. In a case where it is determined that the broadcast data is being output, the process proceeds to step S2.

In step S2, the output control unit 117 determines whether switching of the output from the broadcast data to the communication data has been instructed. For example, in a case where an instruction to switch the output from the broadcast data to the communication data is input by a user via an input unit (not illustrated), the output control unit 117 determines that switching of the output from the broadcast data to the communication data has been instructed and the process proceeds to step S3.

In step S3, the output control unit 117 determines whether a delay amount of the communication transmission path exceeds a threshold value on the basis of the measurement result of the communication traffic measurement unit 116. In a case where it is determined that the delay amount of the communication transmission path exceeds the threshold value, the process proceeds to step S4.

In step S4, the communication STC correction unit 114b adjusts the time of the communication STC. Specifically, the output control unit 117 notifies the communication STC correction unit 114b that the output is to be switched from the broadcast data to the communication data.

In a case where the most recent time stamp of the communication data accumulated in the communication data accumulation unit 115b is after the current time of the correction broadcast STC (including the current time of the correction broadcast STC), the communication STC correction unit 114b synchronizes the time of the communication STC to the current time of the correction broadcast STC. This is the case, for example, where the content data of the communication data succeeding the content data of the broadcast data currently being output has already been accumulated in the communication data accumulation unit 115b.

On the other hand, in a case where the most recent time stamp of the communication data accumulated in the communication data accumulation unit 115b is earlier than the current time of the correction broadcast STC, the communication STC correction unit 114b sets the time of the communication STC on the basis of the time of the most recent time stamp. For example, the communication STC correction unit 114b synchronizes the time of the communication STC to the time of the most recent time stamp. Alternatively, for example, the communication STC correction unit 114b may synchronize the time of the communication STC to time slightly earlier than the time of the most recent time stamp. This is the case, for example, where delay or failure has occurred in the communication transmission path and the content data of the communication data succeeding the content data of the broadcast data currently being output has not been accumulated yet in the communication data accumulation unit 115b.

Here, in a case where a time difference between the time of the communication STC supplied from the communication STC generation unit 113b and the time of the adjusted correction communication STC is T1, the communication STC correction unit 114b thereafter corrects the time of the communication STC to time obtained by subtracting the time difference T1 from the time of the communication STC supplied from the communication STC generation unit 113b. Therefore, thereafter, the time difference (phase difference) between the communication STC and the correction communication STC is kept at T1 and clock intervals (frequency) are kept the same.

In step S5, the output control unit 117 outputs the communication data on the basis of the adjusted communication STC. Specifically, the output control unit 117 reads the content data of the communication data whose time stamp coincides with the current time of the adjusted correction communication STC from the communication data accumulation unit 115b and outputs the read content data.

With these processes, in a case where the communication data given the time stamp after the current time of the correction broadcast STC has been already received, the output is smoothly switched from the broadcast data to the communication data. That is, since the content data of the communication data temporally continuous to the content data of the broadcast data being output is output when the output is switched from the broadcast data to the communication data, the continuity of the content data is secured and no disturbance of video, audio, or the like occurs.

On the other hand, in a case where the communication data given the time stamp after the current time of the correction broadcast STC has not been received yet, data having the most recent time stamp among the content data of the communication data accumulated in the communication data accumulation unit 115b is output. Since the time of this most recent time stamp is earlier than the current time of the correction broadcast STC, repeating in which the time of the output content data is traced back occurs when the output is switched from the broadcast data to the communication data.

Note that, at this time, the output control unit 117 may decode the content data to output or may output the content data without decoding. In addition, in a case where the content data is decoded, the output control unit 117 may decode the content data beforehand or may decode the content data at the time of output.

Thereafter, the process proceeds to step S11.

On the other hand, in a case where it is determined in step S2 that switching from the broadcast data to the communication data has not been instructed, or in a case where it is determined in step S3 that the delay amount of the communication transmission path exceeds the threshold value, the process proceeds to step S6.

In step S6, the output control unit 117 outputs the broadcast data on the basis of the corrected broadcast STC. Specifically, the output control unit 117 reads the content data of the broadcast data whose time stamp coincides with the current time of the correction broadcast STC from the broadcast data accumulation unit 115a and outputs the read content data.

Therefore, in a case where it is determined in step S3 that the delay amount of the communication transmission path exceeds the threshold value, the output of data of the contents of the broadcast data continues without switching the output from the broadcast data to the communication data.

Note that, in this case, for example, the output control unit 117 notifies a latter stage that the output cannot be switched. Then, an appropriate process is performed in the latter stage.

Furthermore, at this time, the output control unit 117 may decode the content data to output or may output the content data without decoding. In addition, in a case where the content data is decoded, the output control unit 117 may decode the content data beforehand or may decode the content data at the time of output.

Thereafter, the process proceeds to step S11.

On the other hand, in a case where it is determined in step S1 that the communication data is being output, the process proceeds to step S7.

In step S7, the output control unit 117 determines whether switching of the output from the communication data to the broadcast data has been instructed. For example, in a case where an instruction to switch the output from the communication data to the broadcast data is input by a user via an input unit (not illustrated), the output control unit 117 determines that switching of the output from the communication data to the broadcast data has been instructed and the process proceeds to step S8.

In step S8, the broadcast STC correction unit 114a adjusts the time of the broadcast STC. Specifically, the output control unit 117 notifies the broadcast STC correction unit 114a that the output is to be switched from the communication data to the broadcast data.

In a case where the oldest time stamp of the broadcast data accumulated in the broadcast data accumulation unit 115a is before the current time of the correction communication STC (including the current time of the correction communication STC), the broadcast STC correction unit 114a synchronizes the time of the correction broadcast STC to the current time of the correction communication STC. This is the case, for example, where the capacity of the broadcast data accumulation unit 115a is sufficient and the content data of the broadcast data succeeding the content data of the communication data currently being output is accumulated.

On the other hand, in a case where the time of the oldest time stamp of the broadcast data accumulated in the broadcast data accumulation unit 115a is later than the current time of the correction communication STC, the broadcast STC correction unit 114a sets the time of the correction broadcast STC on the basis of the time of the oldest time stamp. For example, the broadcast STC correction unit 114a synchronizes the time of the correction broadcast STC to the time of the oldest time stamp. Alternatively, the broadcast STC correction unit 114a synchronizes the time of the correction broadcast STC to time slightly later than the time of the oldest time stamp. This is the case, for example, where the capacity of the broadcast data accumulation unit 115a is insufficient because a significant delay or failure occurs in the communication transmission path and the content data of the broadcast data succeeding the content data of the communication data currently being output has already been deleted from the broadcast data accumulation unit 115a.

Here, in a case where a time difference between the time of the broadcast STC supplied from the broadcast STC generation unit 113a and the time of the adjusted correction broadcast STC is T2, the broadcast STC correction unit 114a thereafter corrects the time of the broadcast STC to time obtained by subtracting the time difference T2 from the time of the broadcast STC supplied from the broadcast STC generation unit 113a. Therefore, thereafter, the time difference (phase difference) between the broadcast STC and the correction broadcast STC is kept at T2 and clock intervals (frequency) are kept the same.

In step S9, the output control unit 117 outputs the broadcast data on the basis of the adjusted broadcast STC. Specifically, the output control unit 117 reads the content data of the broadcast data whose time stamp coincides with the current time of the adjusted correction broadcast STC from the broadcast data accumulation unit 115a and outputs the read content data.

With these processes, in a case where the capacity of the broadcast data accumulation unit 115a is sufficient and the content data of the broadcast data succeeding the content data of the communication data currently being output is accumulated, the output is smoothly switched from the communication data to the broadcast data. That is, since the content data of the broadcast data temporally continuous to the content data of the communication data being output is output when the output is switched from the communication data to the broadcast data, the continuity of the content data is secured and no disturbance of video, audio, or the like occurs.

On the other hand, in a case where the capacity of the broadcast data accumulation unit 115a is insufficient since a significant delay or failure occurs in the communication transmission path and the content data of the broadcast data succeeding the content data of the communication data currently being output is not accumulated, data having the oldest time stamp among the content data of the broadcast data accumulated in the broadcast data accumulation unit 115a is output. Since the time of this oldest time stamp is later than the current time of the correction communication STC, skipping in which the time of the output content data is advanced occurs when the output is switched from the communication data to the broadcast data.

Note that, at this time, the output control unit 117 may decode the content data to output or may output the content data without decoding. In addition, in a case where the content data is decoded, the output control unit 117 may decode the content data beforehand or may decode the content data at the time of output.

Thereafter, the process proceeds to step S11.

On the other hand, in a case where it is determined in step S7 that switching of the output from the communication data to the broadcast data has not been instructed, the process proceeds to step S10.

In step S10, the output control unit 117 outputs the communication data on the basis of the corrected communication STC. Specifically, the output control unit 117 reads the content data of the communication data whose time stamp coincides with the current time of the correction communication STC from the communication data accumulation unit 115b and outputs the read content data.

Note that, at this time, the output control unit 117 may decode the content data to output or may output the content data without decoding. In addition, in a case where the content data is decoded, the output control unit 117 may decode the content data beforehand or may decode the content data at the time of output.

Thereafter, the process proceeds to step S11.

In step S11, the broadcast data accumulation unit 115a determines whether a delay amount of the communication transmission path exceeds a threshold value on the basis of the measurement result of the communication traffic measurement unit 116. In a case where it is determined that the delay amount of the communication transmission path does not exceed the threshold value, the process proceeds to step S12.

Note that the threshold value in step S3 and the threshold value in step S11 may be set to the same value or different values.

In step S12, the broadcast data accumulation unit 115a deletes the broadcast data before the current time of an STC on an output side.

Specifically, in a case where the broadcast data is being output, the broadcast data accumulation unit 115a deletes the content data of the broadcast data whose time stamp is before the current time of the correction broadcast STC (including the current time of the correction broadcast STC) and the corresponding control data. With this process, a condition is obtained in which, among the broadcast data received via the broadcast transmission path, the broadcast data whose time stamp is later than the current time of the correction broadcast STC is accumulated in the broadcast data accumulation unit 115a. Therefore, a condition is obtained in which the broadcast data given the time stamp later than the time stamp of the broadcast data output in step S6 or S9 is accumulated in the broadcast data accumulation unit 115a.

Note that, at this time, for example, the broadcast data accumulation unit 115a may leave a little bit of the broadcast data given the time stamps after time earlier than the current time of the correction broadcast STC by a predetermined time.

On the other hand, in a case where the communication data is being output, the broadcast data accumulation unit 115a deletes the content data of the broadcast data whose time stamp is before the current time of the correction communication STC (including the current time of the correction communication STC) and the corresponding control data. With this process, a condition is obtained in which, among the broadcast data received via the broadcast transmission path, the broadcast data whose time stamp is later than the current time of the correction communication STC is accumulated in the broadcast data accumulation unit 115a. Therefore, a condition is obtained in which the broadcast data given the time stamp later than the time stamp of the communication data output in step S5 or S10 is accumulated in the broadcast data accumulation unit 115a.

Note that, at this time, for example, the broadcast data accumulation unit 115a may leave a little bit of the broadcast data given the time stamps after time earlier than the current time of the communication broadcast STC by a predetermined time.

Thereafter, the process proceeds to step S14.

On the other hand, in a case where it is determined in step S11 that the delay amount of the communication transmission path exceeds the threshold value, the process proceeds to step S13.

In step S13, the broadcast data accumulation unit 115a restricts the accumulation amount of the broadcast data. For example, the broadcast data accumulation unit 115a leaves the content data of the broadcast data given the time stamp within a predetermined time from the most recent time stamp and the corresponding control data, while deleting the content data older than the above content data and the corresponding control data. With this process, a condition is obtained in which, among the broadcast data received via the broadcast transmission path, the broadcast data given the time stamp within a predetermined time from the most recent time stamp is accumulated in the broadcast data accumulation unit 115a.

By this process, the accumulation amount (buffer amount) of the broadcast data in the broadcast data accumulation unit 115a is restricted to a predetermined maximum value. Then, even if the delay amount of the communication transmission path exceeds the threshold value and the difference in the time stamps between the broadcast data and the communication data that have been previously received is widened, the broadcast data exceeding this maximum value will not be accumulated in the broadcast data accumulation unit 115a. That is, the buffer amount of the broadcast data accumulation unit 115a is fixed to the maximum value.

Thereafter, the process proceeds to step S14.

In step S14, the communication data accumulation unit 115b deletes the communication data before the current time of the STC on the output side.

Specifically, in a case where the broadcast data is being output, the communication data accumulation unit 115b deletes the content data of the communication data whose time stamp is before the current time of the correction broadcast STC (including the current time of the correction broadcast STC) and the corresponding control data. With this process, a condition is obtained in which, among the communication data received via the communication transmission path, the communication data whose time stamp is later than the current time of the correction broadcast STC is accumulated in the communication data accumulation unit 115b. Therefore, a condition is obtained in which the communication data given the time stamp later than the time stamp of the broadcast data output in step S6 or S9 is accumulated in the communication data accumulation unit 115b.

Note that, at this time, for example, the communication data accumulation unit 115b may leave a little bit of the communication data given the time stamps after time earlier than the current time of the correction broadcast STC by a predetermined time.

On the other hand, in a case where the communication data is being output, the communication data accumulation unit 115b deletes the content data of the communication data whose time stamp is before the current time of the correction communication STC (including the current time of the correction communication STC) and the corresponding control data. With this process, a condition is obtained in which, among the communication data received via the communication transmission path, the communication data whose time stamp is later than the current time of the correction communication STC is accumulated in the communication data accumulation unit 115b. Therefore, a condition is obtained in which the communication data given the time stamp later than the time stamp of the communication data output in step S5 or S10 is accumulated in the communication data accumulation unit 115b.

Note that, at this time, for example, the communication data accumulation unit 115b may leave a little bit of the communication data given the time stamps after time earlier than the current time of the communication broadcast STC by a predetermined time.

Thereafter, the process returns to step S1 and the processes after step S1 are executed.

The output can be smoothly switched between the broadcast data and the communication data as described thus far. This point will be described in a bit more detail with reference to FIGS. 3 and 4.

Note that, in the following description, in order to make the explanation easy to understand, the phrase of the content data in the case of outputting the content data of the broadcast data will be sometimes omitted and simply expressed as outputting the broadcast data. Likewise, the phrase of the content data in the case of outputting the content data of the communication data will be sometimes omitted and simply expressed as outputting the communication data.

As described above, delay or non-delivery of the broadcast data hardly occurs in the broadcast transmission path, whereas delay or non-delivery of the communication data occurs in the communication transmission path. Therefore, there is a case where the communication STC generated on the basis of the time stamp of the communication data falls behind the broadcast STC generated on the basis of the time stamp of the broadcast data. However, since the time of the broadcast STC and the time of the communication STC are synchronized in the reception device 101 when the output is switched, the time of the broadcast STC is basically synchronized to the time of the communication STC having a possibility of delay.

Then, since the broadcast data is output in accordance with the correction broadcast STC and the communication data is output in accordance with the correction communication STC, the timing of outputting the broadcast data and the communication data is controlled basically on the basis of the time stamp of the communication data whose time stamp has a possibility of falling behind the time stamp of the broadcast data. With these processes, for example, the broadcast data is output following the delay of the transmission of the communication data. That is, in a case where the transmission of the communication data is delayed, the broadcast data given the time stamp near the most recent time stamp of the communication data that has been previously received is output. Additionally, the broadcast data whose time stamp is newer than the output broadcast data is accumulated in the broadcast data accumulation unit 115a.

Figure 3:
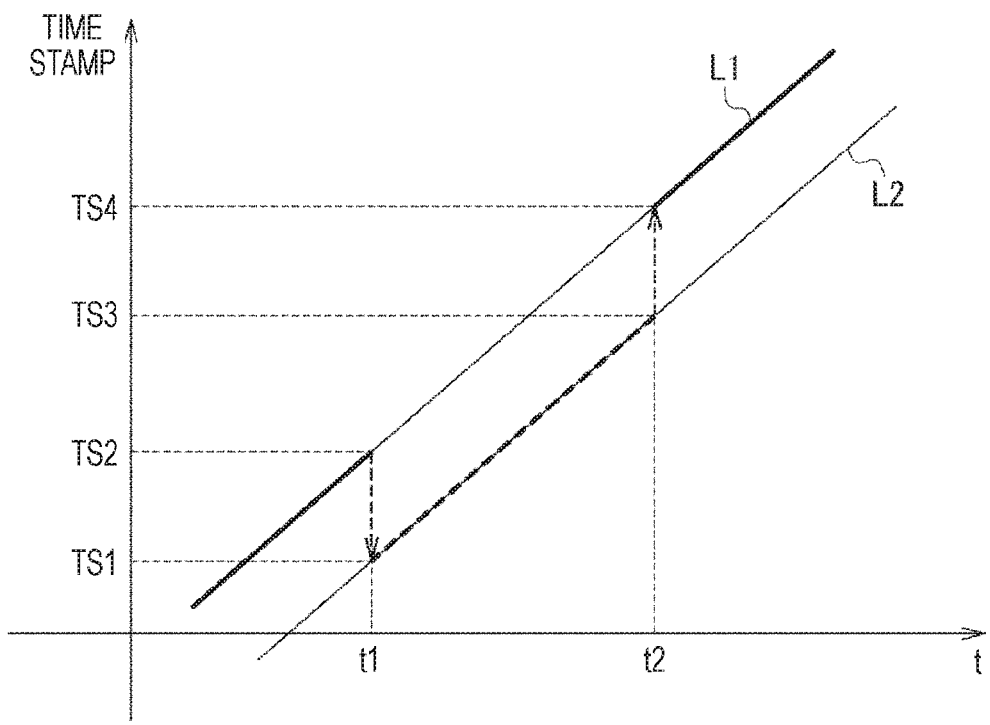
FIG. 3 is a graph illustrating a first example of transition of time stamps of received data and output data.

For example, FIG. 3 is a graph illustrating an example of transition of the time stamps of received data and output data in a case where the received broadcast data and communication data are independently output as they are. A horizontal axis of the graph represents the actual time and a vertical axis represents the time stamp. Straight line L1 indicates the transition of the time stamps of the received broadcast data and straight line L2 indicates the transition of the time stamps of the received communication data. In this example, a transmission delay occurs in the communication data and a time difference arises between the time stamps of the broadcast data and the communication data received at the same time. In addition, a thick solid line on straight line L1 indicates the transition of the time stamps of the output broadcast data and a thick dotted line on straight line L2 indicates the transition of the time stamps of the output communication data.

For example, in a case where the output is switched from the broadcast data to the communication data at time t1 at which the broadcast data having the time stamp at time TS2 is scheduled to be output, only the communication data having the time stamps up to time TS1 earlier than the time TS2 is received. Therefore, when the output is switched, the communication data having the time stamp at the time TS1 is output. That is, repeating in which the time stamp of data to be output is returned from the time TS2 to the time TS1 occurs at the time t1.

Next, in a case where the output is switched from the communication data to the broadcast data at time t2 at which the communication data having the time stamp at time TS3 is scheduled to be output, the broadcast data having the time stamps up to time TS4 later than the time TS3 has already been received. Therefore, when the output is switched, the broadcast data having the time stamp at the time TS4 is output. That is, skipping in which the time stamp of data to be output is advanced from the time TS3 to the time TS4 occurs at the time t2.

Figure 4:
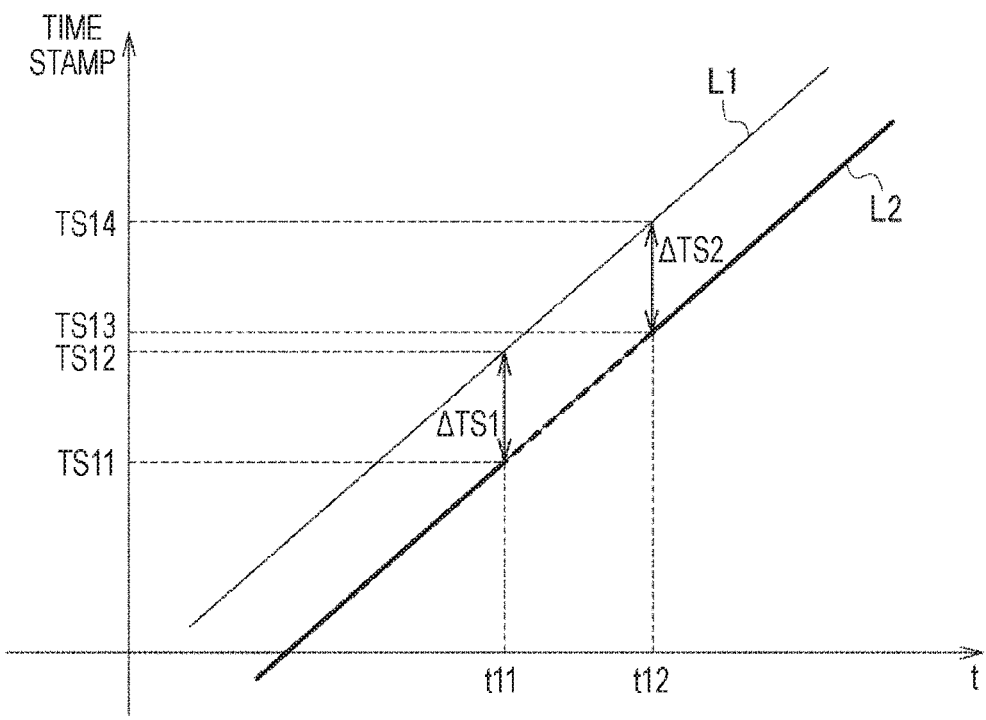
FIG. 4 is a graph illustrating a second example of transition of time stamps of received data and output data.

On the other hand, FIG. 4 is a graph illustrating an example of transition of time stamps of received data and output data of the reception device 101. As in FIG. 3, a horizontal axis of the graph represents the actual time and a vertical axis represents the time stamp. Straight lines L1 and L2 are the same ones as straight lines L1 and L2 in FIG. 3. In addition, a thick solid line on straight line L2 indicates the transition of the time stamps of the output broadcast data and a thick dotted line on straight line L2 indicates the transition of the time stamps of the output communication data.

As illustrated in this example, the time stamp of the output broadcast data almost coincides with the most recent time stamp of the communication data that has been previously received. Then, for example, in a case where the output is switched from the broadcast data to the communication data at time t11 at which the broadcast data having the time stamp at time TS11 is scheduled to be output, the communication data having the time stamp at time TS11 has already been received. Therefore, when the output is switched, the communication data having the time stamp at the time TS11 is output. In addition, at the time t11, at least the broadcast data for a time ΔTS1 having the time stamps from the time TS11 to most recent time TS12 is accumulated in the broadcast data accumulation unit 115a.

Next, in a case where the output is switched from the communication data to the broadcast data at time t12 at which the communication data having the time stamp at time TS13 is scheduled to be output, at least the broadcast data for a time ΔTS2 having the time stamps from the time TS13 to most recent time TS14 is accumulated in the broadcast data accumulation unit 115a. Therefore, when the output is switched, the broadcast data having the time stamp at time TS13 is output.

As described above, even if delay arises in the communication transmission path, it is possible to smoothly switch the output.

In addition, although FIGS. 3 and 4 illustrate examples in which the time difference between the time stamps of the received broadcast data and communication data is constant, a case is also assumed in which the time difference between the time stamps transitions so as to be widened or narrowed. In this case, a difference in time transition (clock intervals) arises between the broadcast STC and the communication STC and time deviation occurs between the correction broadcast STC and the correction communication STC.

However, in a case where the broadcast data is being output, at least the communication data after the current time of the correction broadcast STC is accumulated in the communication data accumulation unit 115b by the process in step S14. Therefore, in a case where the output is switched from the broadcast data to the communication data, the communication data temporally continuous to the broadcast data being output is present in the communication data accumulation unit 115b. Therefore, even if the time deviation arises between the correction broadcast STC and the correction communication STC, it is possible to reliably output the communication data temporally continuous to the broadcast data being output when the output is switched.

Similarly, in a case where the communication data is being output, at least the broadcast data after the current time of the correction communication STC is accumulated in the broadcast data accumulation unit 115a by the process in step S12. Therefore, in a case where the output is switched from the communication data to the broadcast data, the broadcast data temporally continuous to the communication data being output is present in the broadcast data accumulation unit 115a. Therefore, even if the time deviation arises between the correction broadcast STC and the correction communication STC, it is possible to reliably output the broadcast data temporally continuous to the communication data being output when the output is switched.

As described above, even if time deviation arises between the broadcast STC and the communication STC, it is possible to smoothly switch the output.

2. Variations

Hereinafter, variations of the above-described embodiments of the present technology will be described.

{First Variation: Variation in Case of Using Combination of Two Other Types of Transmission Paths}

The present technology can also be applied to the case of transmitting data via two types of transmission paths other than a combination of the broadcast transmission path and the communication transmission path.

Figure 2:
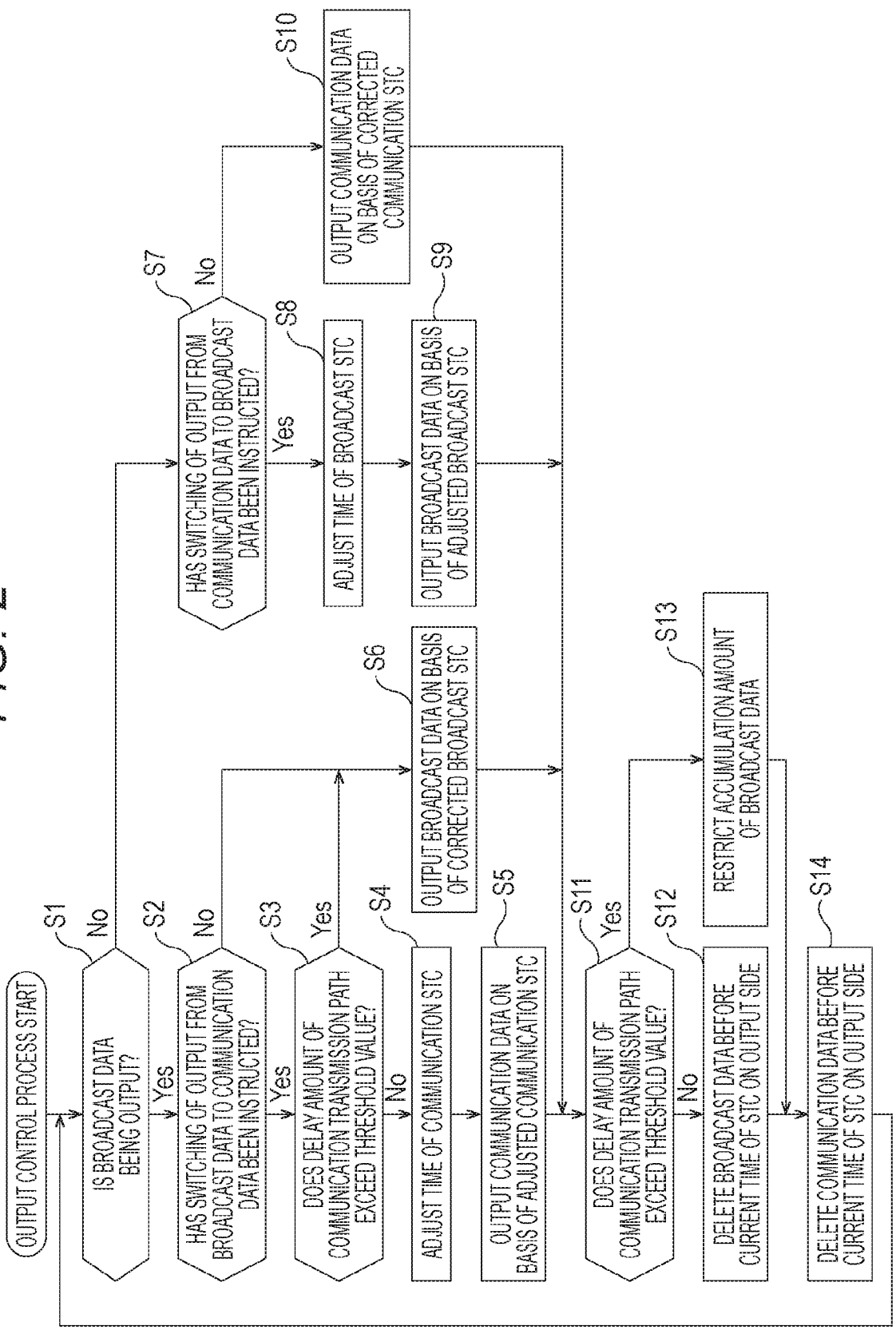
FIG. 2 is a flowchart for explaining an output control process executed by the reception device.

However, the output control process in FIG. 2 is performed on the premise that delay occurs in the communication transmission path but delay hardly occurs in the broadcast transmission path. Therefore, in a case where delay occurs in both of the two types of transmission paths, a minor change of the process is necessary.

Specifically, for example, processes similar to those in steps S2 to S6 in FIG. 2 are simply performed irrespective of data switching direction.

However, in a determination process in step S3, for example, a delay amount of a transmission path of switching destination data relative to a transmission path of switching source data is determined. Here, the switching source data represents data currently being output and the switching destination data represents data to be output after switching.

In addition, as in the process in step S4, when the output is switched, an STC corresponding to the switching destination data (hereinafter referred to as switching destination STC) is synchronized to the time of an STC corresponding to the switching source data (hereinafter referred to as switching source STC) that has been corrected. However, as in the process in step S4, in a case where the most recent time stamp of the accumulated switching destination data is earlier than the time of the corrected switching source STC, the time of the switching destination STC is set on the basis of the time of the most recent time stamp. Meanwhile, as in the process in step S8, in a case where the oldest time stamp of the accumulated switching destination data is later than the time of the corrected switching source STC, the time of the switching destination STC is set on the basis of the time of the oldest time stamp.

Furthermore, for example, in a case where the delay amount of one transmission path relative to another transmission path exceeds a threshold value, the accumulation amount of data of the one transmission path is restricted as in the process in step S13.

{Second Variation: Variation in Case of Using Three or More Types of Transmission Paths}

Additionally, the present technology can also be applied to the case of transmitting data via three or more types of transmission paths. In this case, the timing of outputting the selected data is simply controlled on the basis of the time stamp of most delayed data (the data having a latest time stamp) among data transmitted via the respective transmission paths.

For example, as in the processes in steps S4 and S8 in FIG. 2, the time of the switching destination STC can be synchronized to the time of the corrected switching source STC when the output is switched. In addition, in a case where the most recent time stamp of the accumulated switching destination data is earlier than the time of the corrected switching source STC, the time of the switching destination STC can be set on the basis of the time of the most recent time stamp. Furthermore, in a case where the oldest time stamp of the accumulated switching destination data is later than the time of the corrected switching source STC, the time of the switching destination STC can be set on the basis of the time of the oldest time stamp.

With these processes, finally, the time of each STC is synchronized to the time of a most delayed STC. As a result, the timing of outputting the selected data is controlled on the basis of the time stamp of most delayed data.

In addition, for example, as in the processes in steps S12 and S14 in FIG. 2, at least data given the time stamp later than the time of the corrected STC corresponding to the data being output can be accumulated for each data.

Furthermore, for example, as in the processes in steps S3 and S6 in FIG. 2, in a case where switching of the output is instructed, switching is simply not performed when the delay amount of the transmission path of the switching destination data relative to the transmission path of the switching source data exceeds a first threshold value.

Additionally, for example, as in the processes in steps S11 and S13 in FIG. 2, in a case where the delay amount of a transmission path B through which the data being output is transmitted relative to a certain transmission path A exceeds a second threshold value, the accumulation amount of data transmitted via the transmission path A can be restricted.

Note that the first threshold value and the second threshold value may be set to the same value or different values.

{Third Variation: Variation Relating to STC}

In addition, for example, the STC may be generated on the basis of a time stamp other than the PTS.

Furthermore, for example, the STC may be generated on the basis of an NTP.

However, since delay is not reflected immediately in the NTP due to its nature even if occurred, the NTP basically has a structure that does not have jitter. Therefore, in a case where the STC is generated on the basis of the NTP, this STC will not include jitter which occurs due to whether delay is present, fluctuation, or the like in the communication transmission path. On the other hand, the STC generated on the basis of the PTS which is one type of the time stamp includes jitter in the communication transmission path. Therefore, jitter in the communication transmission path is more accurately reflected on the STC in a case where the STC based on the PTS is used than a case where the STC based on the NTP is used and thus, skipping and repeating when the output is switched is not easier to occur.

Accordingly, for example, the STC may be generated on the basis of the NTP such that the STC which has been corrected by adding an observed value of the delay amount of the communication transmission path is used in common on a broadcast side and a communication side. In this case, the STC can be generated with reference to a stable NTP.

{Other Variations}

Additionally, for example, the delay amount of the communication transmission path may be predicted on the basis of the measurement result for the traffic of the communication transmission path by the communication traffic measurement unit 116 such that the buffer amount of the broadcast data accumulation unit 115a is adjusted. In this case, an initial value of the buffer amount of the broadcast data accumulation unit 115a may be defined beforehand.

Furthermore, sending sources of data transmitted via a plurality of transmission paths are not necessarily the same. For example, the broadcast data may be transmitted from a broadcast station via the broadcast transmission path and the communication data may be transmitted from a communication company via the communication transmission path.

In addition, for example, a display device such as a display, an audio output device such as a speaker, or the like may be provided in the reception device 101 so as to perform a process of presenting the content data (for example, display of video/image and output of audio).

Furthermore, the present technology is not limited to the case of transmitting data using the MMT but can also be applied, for example, to the case of transmitting a plurality of pieces of data given time stamps corresponding to each other via different transmission paths.

{Configuration Example of Computer}

A series of the above-described processes can be executed by hardware as well and also can be executed by software. In a case where the series of the processes is executed by software, a program constituting the software is installed in a computer. Herein, the computer includes a computer built into dedicated hardware and a computer capable of executing various functions when installed with various programs, for example, a general-purpose personal computer.

Figure 5:
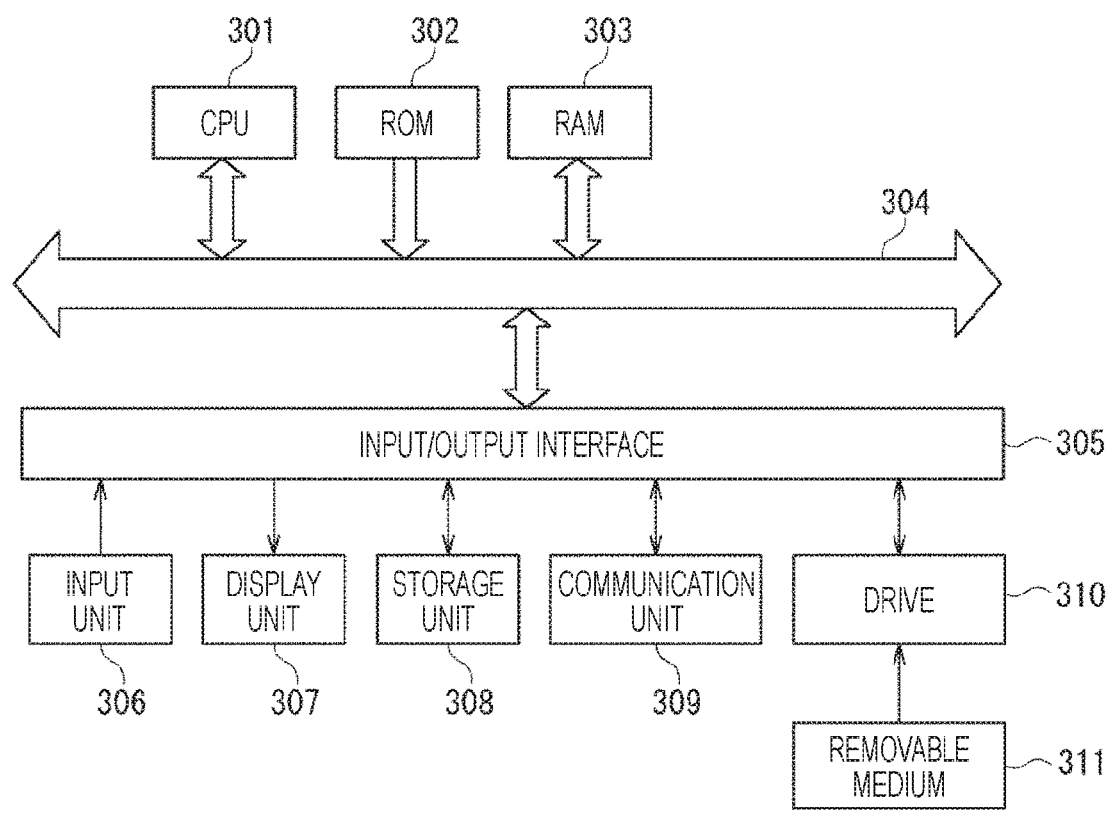
FIG. 5 is a block diagram illustrating a configuration example of a computer.

FIG. 5 is a block diagram illustrating a hardware configuration example of a computer that executes the above-described series of the processes using a program.

In the computer, a central processing unit (CPU) 301, a read only memory (ROM) 302, and a random access memory (RAM) 303 are interconnected through a bus 304.

Additionally, an input/output interface 305 is connected to the bus 304. An input unit 306, an output unit 307, a storage unit 308, a communication unit 309, and a drive 310 are connected to the input/output interface 305.

The input unit 306 includes a keyboard, a mouse, a microphone and the like. The output unit 307 includes a display, a speaker and the like. The storage unit 308 includes a hard disk, a non-volatile memory and the like. The communication unit 309 includes a network interface and the like. The drive 310 drives a removable medium 311 such as a magnetic disk, an optical disc, a magneto-optical disk, or a semiconductor memory.

In the computer configured as described above, for example, the above-described series of the processes is performed in such a manner that the CPU 301 loads a program stored in the storage unit 308 to the RAM 303 via the input/output interface 305 and the bus 304 to execute.

For example, the program executed by the computer (CPU 301) can be provided by being recorded in the removable medium 311 serving as a package medium or the like. Furthermore, the program can be provided via a wired or wireless transmission medium such as a local area network, the Internet, or digital satellite broadcasting.

In the computer, the program can be installed to the storage unit 308 via the input/output interface 305 by mounting the removable medium 311 in the drive 310. Furthermore, the program can be installed to the storage unit 308 via a wired or wireless transmission medium when received by the communication unit 309. As an alternative manner, the program can be installed to the ROM 302 or the storage unit 308 in advance.

Note that, the program executed by a computer may be a program in which the processes are performed along the time series in accordance with the order described in the present description, or alternatively, may be a program in which the processes are performed in parallel or at a necessary timing, for example, when called.

Furthermore, in the present description, a system refers to a collection of a plurality of constituent members (e.g., devices and modules (parts)) and whether all the constituent members are arranged within the same cabinet is not regarded as important. Therefore, a plurality of devices accommodated in separate cabinets so as to be connected to one another via a network and one device of which a plurality of modules is accommodated within one cabinet are both deemed as systems.

In addition, the embodiments according to the present technology are not limited to the above-described embodiments and various modifications can be made without departing from the scope of the present technology.

For example, the present technology can employ a cloud computing configuration in which one function is divided and allocated to a plurality of devices so as to be processed in coordination thereamong via a network.

Furthermore, the respective steps described in the aforementioned flowchart can be executed by a plurality of devices each taking a share thereof as well as executed by a single device.

Additionally, in a case where a plurality of processes is included in one step, the plurality of processes included in one step can be executed by a plurality of devices each taking a share thereof as well as executed by a single device.

Furthermore, the effects described in the present description merely serve as examples and not construed to be limited. There may be another effect.

In addition, the embodiments according to the present technology are not limited to the above-described embodiments and various modifications can be made without departing from the scope of the present technology.

Furthermore, note that, for example, the present technology can be also configured as described below.

(1)

A reception device including:

a reception unit that receives a plurality of pieces of data separately transmitted via different transmission paths and given time stamps corresponding to each other;

an output control unit that selects data to be output from among the plurality of pieces of data and controls a timing of outputting the selected data on the basis of the time stamp of a piece of data having a latest time stamp among the plurality of pieces of data; and an accumulation unit that accumulates at least the plurality of pieces of data given the time stamps later than the time stamp of the data that has been output from among the received plurality of pieces of data.

(2)

The reception device according to above (1), in which the reception unit includes a first reception unit that receives first data given a first time stamp and transmitted via a first transmission path and a second reception unit that receives second data given a second time stamp corresponding to the first time stamp and transmitted via a second transmission path, the reception device further including:

a first clock signal generation unit that generates a first clock signal on the basis of the first time stamp;

a second clock signal generation unit that generates a second clock signal on the basis of the second time stamp;

a first clock signal correction unit that corrects the first clock signal; and a second clock signal correction unit that corrects the second clock signal, in which the first clock signal correction unit synchronizes time of the first clock signal to time of the corrected second clock signal when output is switched from the second data to the first data, the second clock signal correction unit synchronizes time of the second clock signal to time of the corrected first clock signal when output is switched from the first data to the second data, the output control unit controls output of the first data on the basis of the corrected first clock signal and controls output of the second data on the basis of the corrected second clock signal, and in a case where the first data is being output, the accumulation unit accumulates at least the first data given the first time stamp later than time of the corrected first clock signal and the second data given the second time stamp later than time of the corrected first clock signal and, in a case where the second data is being output, accumulates at least the first data given the first time stamp later than time of the corrected second clock signal and the second data given the second time stamp later than time of the corrected second clock signal.

(3)

The reception device according to above (2), in which the first transmission path is a broadcast transmission path, the second transmission path is a communication transmission path, and in a case where the most recent second time stamp of the second data accumulated in the accumulation unit is earlier than time of the corrected first clock signal, the second clock signal correction unit sets time of the second clock signal on the basis of time of the most recent second time stamp when output is switched from the first data to the second data.

(4)

The reception device according to above (3), in which the accumulation unit restricts an accumulation amount of the first data in a case where a delay amount of the communication transmission path exceeds a first threshold value.

(5)

The reception device according to above (4), in which in a case where the oldest first time stamp of the first data accumulated in the accumulation unit is later than time of the corrected second clock signal, the first clock signal correction unit sets time of the first clock signal on the basis of time of the oldest first time stamp when output is switched from the second data to the first data.

(6)

The reception device according to above (4) or (5), in which the output control unit does not switch output from the first data to the second data in a case where a delay amount of the communication transmission path exceeds a second threshold value.

(7)

The reception device according to above (2), in which in a case where the most recent first time stamp of the first data accumulated in the accumulation unit is earlier than time of the corrected second clock signal, the first clock signal correction unit sets time of the first clock signal on the basis of time of the most recent first time stamp when output is switched from the second data to the first data, and in a case where the most recent second time stamp of the second data accumulated in the accumulation unit is earlier than time of the corrected first clock signal, the second clock signal correction unit sets time of the second clock signal on the basis of time of the most recent second time stamp when output is switched from the first data to the second data.

(8)

The reception device according to above (7), in which the accumulation unit restricts an accumulation amount of the first data in a case where a delay amount of the second transmission path relative to the first transmission path exceeds a first threshold value and restricts an accumulation amount of the second data in a case where a delay amount of the first transmission path relative to the second transmission path exceeds a second threshold value.

(9)

The reception device according to above (8), in which in a case where the oldest first time stamp of the first data accumulated in the accumulation unit is later than time of the corrected second clock signal, the first clock signal correction unit sets time of the first clock signal on the basis of time of the oldest first time stamp when output is switched from the second data to the first data, and in a case where the oldest second time stamp of the second data accumulated in the accumulation unit is later than time of the corrected first clock signal, the second clock signal correction unit sets time of the second clock signal on the basis of time of the oldest second time stamp when output is switched from the first data to the second data.

(10)

The reception device according to above (8) or (9), in which the output control unit does not switch output from the first data to the second data in a case where a delay amount of the second transmission path relative to the first transmission path exceeds a third threshold value and does not switch output from the second data to the first data in a case where a delay amount of the first transmission path relative to the second transmission path exceeds a fourth threshold value.

(11)

The reception device according to above (1), further including:

a clock signal generation unit that generates a plurality of clock signals on the basis of the time stamp of each piece of data; and a clock signal correction unit that corrects the plurality of clock signals, in which the clock signal correction unit synchronizes time of one of the clock signals corresponding to switching destination data to time of corrected one of the clock signals corresponding to switching source data when data to be output is switched, the output control unit controls the output of each piece of data on the basis of each corresponding one of the clock signals, and the accumulation unit accumulates at least the plurality of pieces of data given the time stamps later than time of corrected one of the clock signals corresponding to data being output.

(12)

The reception device according to above (11), in which in a case where the most recent time stamp of the switching destination data accumulated in the accumulation unit is earlier than time of corrected one of the clock signals corresponding to the switching source data, the clock signal correction unit sets time of one of the clock signals corresponding to the switching destination data on the basis of time of the most recent time stamp of the switching destination data when data to be output is switched.

(13)

The reception device according to above (12), in which the accumulation unit restricts an accumulation amount of second data in a case where first data among the plurality of pieces of data is being output, in a case where a delay amount of a first transmission path used for transmission of the first data relative to a second transmission path used for transmission of the second data among the plurality of pieces of data exceeds a first threshold value.

(14)

The reception device according to above (13), in which in a case where the oldest time stamp of the second data accumulated in the accumulation unit is later than time of a first clock signal corresponding to the first data, which has been corrected, the clock signal correction unit sets time of a second clock signal corresponding to the second data on the basis of time of the oldest time stamp when output is switched from the first data to the second data.

(15)

The reception device according to above (13) or (14), in which the output control unit does not switch output from the second data to the first data in a case where a delay amount of the first transmission path relative to the second transmission path exceeds a second threshold value.

(16)

The reception device according to any one of above (1) to (15), in which the plurality of pieces of data is transmitted using MPEG media transport (MMT), and the time stamp is a presentation time stamp (PTS).

(17)

A data processing method including:

a reception control step of controlling reception of a plurality of pieces of data separately transmitted via different transmission paths and given time stamps corresponding to each other;

an output control step of selecting data to be output from among the plurality of pieces of data and controlling a timing of outputting the selected data on the basis of the time stamp of a piece of data having a latest time stamp among the plurality of pieces of data; and an accumulation control step of controlling such that at least the plurality of pieces of data given the time stamps later than the time stamp of the data that has been output is accumulated from among the received plurality of pieces of data.

(18)

A program that causes a computer to execute processes including:

a reception control step of controlling reception of a plurality of pieces of data separately transmitted via different transmission paths and given time stamps corresponding to each other;

an output control step of selecting data to be output from among the plurality of pieces of data and controlling a timing of outputting the selected data on the basis of the time stamp of a piece of data having a latest time stamp among the plurality of pieces of data; and an accumulation control step of controlling such that at least the plurality of pieces of data given the time stamps later than the time stamp of the data that has been output is accumulated from among the received plurality of pieces of data.

REFERENCE SIGNS LIST

101 Reception device
111 Reception unit
111a Broadcast data reception unit
111b Communication data reception unit
112 Time stamp analysis unit
112a Broadcast time stamp analysis unit
112b Communication time stamp analysis unit
113 STC generation unit
113a Broadcast STC generation unit
113b Communication STC generation unit
114 STC correction unit
114a Broadcast STC correction unit
114b Communication STC correction unit
115 Accumulation unit
115a Broadcast data accumulation unit
115b Communication data accumulation unit
116 Communication traffic measurement unit
117 Output control unit

The invention claimed is:

1. A reception device comprising:
a reception unit that is electronically connectable to a broadcast station in a manner that permits the reception unit to:
receive packets of data from the broadcast station via a first transmission path,
receive the packets from the broadcast station via a second transmission path that differs from the first transmission path;
wherein the reception device is configured to:
determine a time difference between receipt, by the reception unit, of one of the packets via the first transmission path and via the second transmission path,
inhibit a switching of processing to the packets received via the second transmission path when the reception device determines that the time difference exceeds a threshold value.

2. The reception device according to claim 1, wherein:
the first transmission path is an electronic communication pathway between the broadcast station and the reception unit.

3. The reception device according to claim 2, wherein:
the second transmission path is another electronic communication pathway between the broadcast station and the reception unit.

4. The reception device according to claim 1, wherein:
the device is configured to:
permit the switching of processing to the packets received via the second transmission path when the reception device determines that receipt of the packets by the reception unit is via the first transmission path.

5. The reception device according to claim 4, wherein:
the reception device is configured to:
determine whether or not the reception unit receives the packets via the first transmission path.

6. The reception device according to claim 1, further comprising:
an accumulation unit configured to:
restrict an accumulation amount of the data from the broadcast station via the first transmission path when the time difference exceeds another threshold value.

7. A data processing method comprising:
receiving, by a reception unit that is electronically connectable to a broadcast station, packets of data from the broadcast station via a first transmission path;
receiving, by the reception unit, the packets from the broadcast station via a second transmission path that differs from the first transmission path;
determining, by a reception device that comprises the reception unit, a time difference between the reception unit receiving one of the packets via the first transmission path and the reception unit receiving the one of the packets via the second transmission path; and
inhibiting, by the reception device, a switching of processing to the packets received via the second transmission path when the reception device determines that the time difference exceeds a threshold value.

8. The data processing method according to claim 7, wherein:
the first transmission path is an electronic communication pathway between the broadcast station and the reception unit.

9. The data processing method according to claim 8, wherein:
the second transmission path is another electronic communication pathway between the broadcast station and the reception unit.

10. The data processing method according to claim 7, further comprising:
determining, by the reception device, whether or not the reception unit receives the packets via the first transmission path.

11. The data processing method according to claim 10 wherein:
permitting, by the reception device, the switching of processing to the packets received via the second transmission path when the reception device determines that receipt of the packets by the reception unit is via the first transmission path.

12. The data processing method according to claim 7, further comprising:
restricting, by an accumulation unit, an accumulation amount of the data from the broadcast station via the first transmission path when the time difference exceeds another threshold value.

13. A tangible non-transitory computer-readable storage medium, the computer-readable storage medium is configured to store a program executable by a reception device, the reception device upon execution of the program is configured to perform the data processing method according to claim 7.

* * * * *